United States Patent [19]

Dominguez

[11] 4,429,952

[45] Feb. 7, 1984

[54] TRACKING REFLECTOR ASSEMBLY FOR A SKYLIGHT

[76] Inventor: Richard L. Dominguez, 3835 W. Eva Ave., Phoenix, Ariz. 85021

[21] Appl. No.: 335,173

[22] Filed: Dec. 28, 1981

[51] Int. Cl.³ .................. G02B 17/00; G02B 27/00
[52] U.S. Cl. .................... 350/258; 126/425; 250/203 R
[58] Field of Search ............... 350/258–265, 350/289; 250/203 R; 126/417, 424, 425

[56] References Cited

U.S. PATENT DOCUMENTS

| | | | |
|---|---|---|---|
| 3,996,460 | 12/1976 | Smith | 250/203 R |
| 4,031,385 | 6/1977 | Zerlaut et al. | 250/203 R |
| 4,114,186 | 9/1978 | Dominguez | 362/35 |
| 4,146,784 | 3/1979 | Yekutieli | 250/203 R |
| 4,179,612 | 12/1979 | Smith | 250/203 R |
| 4,225,781 | 9/1980 | Hammons | 250/203 R |
| 4,266,530 | 5/1981 | Steadman | 126/424 |
| 4,295,621 | 10/1981 | Siryj | 126/425 X |
| 4,297,000 | 10/1981 | Fries | 350/265 X |
| 4,340,812 | 7/1982 | Mori | 350/258 X |

*Primary Examiner*—Richard A. Wintercorn
*Attorney, Agent, or Firm*—Cahill, Sutton & Thomas

[57] ABSTRACT

A tracking reflector assembly for a skylight includes a ring-shaped base member rotatably supported above the skylight by a plurality of rollers which engage a channel formed within an annular wall of the ring. A reflector is pivotally coupled to the ring for reflecting light into the skylight to supplement light which strikes the skylight directly. A vertical drive motor operates in response to a pair of photosensors for raising and lowering the reflector to follow changes in the angular elevation of the sun. The ring-shaped base member includes a toothed lower surface engaged by a gear coupled to a horizontal drive motor for rotating the ring-shaped base member in response to a third photosensor for following east-to-west movement of the sun. Each of the aforementioned photosensors is normally shaded and actuates the associated drive motor only when being struck by direct sunlight. A vertical limit switch limits the amount by which the reflector may be pivotally raised to avoid reflecting midday summer sunlight into the skylight. Another switch is responsive to closure of the reflector over the base member for preventing the vertical drive motor from attempting to further pivot the reflector downwardly. A fourth photosensor senses darkness resulting from sunset or heavy overcast conditions for pivoting the reflector downwardly and returning the base member and reflector to an easterly direction. A limit switch senses the return of the base member to the full east position for terminating actuation of the horizontal drive motor. A user operated switch selectively enables the tracking reflector assembly to operate automatically or causes the reflector to be lowered and the base member to be returned to the full east position until the user again enables the automatic control circuitry.

20 Claims, 14 Drawing Figures

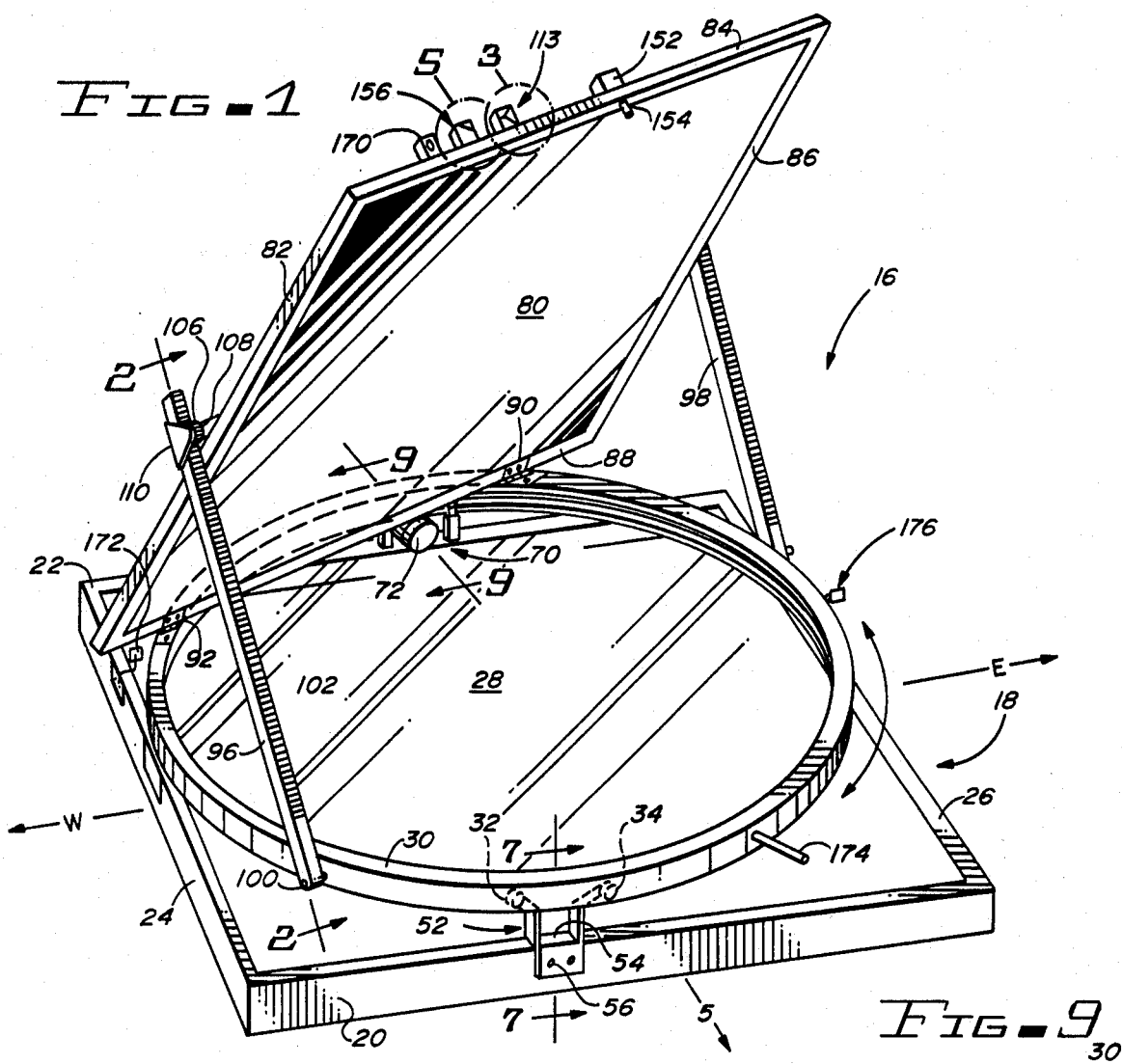
FIG-1
FIG-9
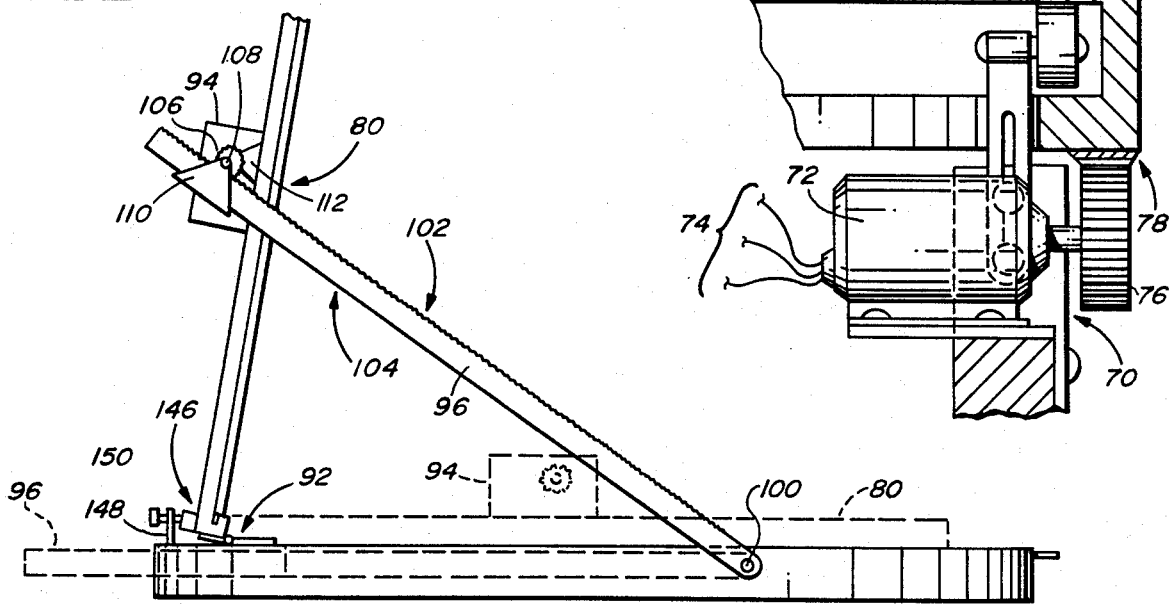
FIG-2

TRACKING REFLECTOR ASSEMBLY FOR A SKYLIGHT

BACKGROUND OF THE INVENTION

1. Field of the Invention

The present invention relates generally to roof-mounted skylights, and more particularly, to a tracking reflector assembly for use in conjunction with such a skylight whereby the reflector automatically tracks daily and seasonal movements of the sun for selectively increasing the amount of sunlight directed through the skylight.

2. Description of the Prior Art

Roof mounted skylights have long been used as an inexpensive means for illuminating and, to some extent, heating homes, offices, and commercial buildings. In recent years, the popularity of skylights has been increasing due to greater public awareness of the need to conserve energy. In reality, however, the use of skylights often results in a net energy loss due to summer heat gain through the skylight in warmer climates and winter heat loss through the skylight in colder climates. A further disadvantage of the conventional skylight is that it does not presently appear to qualify for federal tax credits as an energy conserving device.

In applicant's co-pending patent application Ser. No. 256,057, an apparatus is disclosed for selectively reflecting additional amounts of sunlight through a skylight while shading the skylight from direct overhead summer sunlight. While significantly improving upon the performance of a conventional skylight, the reflector/shade apparatus disclosed in the aforementioned patent application is not adapated to automatically track daily and seasonal movements of the sun. Accordingly, useage of the reflective surface during early morning and late afternoon hours is not optimized. Moreover, the position of the reflector must periodically be manually adjusted to account for seasonal variations in the position of the sun, thereby requiring the user to go up to the roof to the point at which the skylight is located.

U.S. Pat. No. 3,709,583 discloses a covering device for skylights, including a frame mounted in the skylight opening and including horizontally disposed reflector panels. The frame may be rotated, and the panels may be tilted, to follow relative movements of the sun. The reflective panels are of the so-called "triple reflector" type and are adapted to reflect away from the skylight light rays impinging upon the skylight at particular angles. While serving to prevent excessive heat gain during summer months, the device disclosed in this patent is incapable of significantly increasing the amount of light directed through the skylight during winter months and during early morning and later afternoon hours of summer.

U.S. Pat. No. 4,114,186, issued to the present applicant, discloses a lighting fixture which, in one embodiment thereof, includes a telescoping cylindrical light duct including a rotatable top portion having a pivotally connected reflective lid. The specification within applicant's patent describes certain apparatus which may be used to rotate the upper portion of the light fixture in order to follow movements of the sun. However, no means is provided for controlling the elevation of the reflective lid to follow elevational movements of the sun. More importantly, the lighting fixture disclosed by this patent is not adaptable for useage with a conventional skylight.

Accordingly, it is an object of the present invention to provide an apparatus for selectively reflecting sunlight through a conventional skylight in addition to sunlight which directly strikes the skylight, which apparatus is adapted to track daily and seasonal movements of the sun.

It is another object of the present invention to provide an apparatus for useage in conjunction with a conventional skylight which increases the amount of light and associated heat gain provided by the skylight during winter months and which is adapted to increase the amount of light provided by the skylight during early morning and late afternoon portions of summer days while preventing excessive amounts of light and associated heat gain from passing through the skylight during the middle portion of summer days.

It is yet another object of the present invention to provide such a tracking skylight reflector assembly which is of relatively inexpensive and simple construction, which is relatively immune to adverse weather conditions, and which may easily be installed for use with new or existing skylights.

It is still another object of the present invention to provide such a tracking skylight reflector assembly that may easily be secured to the frame of a conventional skylight and which may be easily adjusted to account for the dome height of a wide variety of skylights.

It is a further object of the present invention to provide such a tracking skylight reflector assembly which is capable of automatically cycling itself from one day to the next.

It is still a further object of the present invention to provide such a tracking skylight reflector assembly which is adapted to automatically shut down during periods of heavy overcast or dangerously high winds.

It is a still further object of the present invention to provide such a tracking skylight reflector assembly which may be conveniently controlled by a user to either operate under automatic control or to shut down to a passive readied position until the user again enables the automatic controls.

These and other objects of the present invention will become more apparent to those skilled in the art as the description thereof proceeds.

SUMMARY OF THE INVENTION

Briefly described, and in accordance with one embodiment thereof, the present invention relates to a skylight reflector assembly adapted to track daily and seasonal movements of the sun and including a rotatably supported base member which preferably is in the form of a ring having a diameter commensurate with the width of the skylight frame. Rollers, or other rotatable support devices, allow the base member to rotate about an axis substantially perpendicular to the center of the skylight dome. A reflector, preferably having a width commensurate with that of the skylight frame, is pivotally coupled to the base member for reflecting sunlight through the skylight in addition to the sunlight which strikes the skylight directly. The reflector is pivotally movable between a closed position substantially overlying and shading the skylight and an opened position for allowing sunlight to strike the skylight directly and via reflection.

To allow the skylight reflector assembly to track movements of the sun, a vertical drive mechanism is coupled to the reflector for pivoting the reflector relative to the base member, and a horizontal drive mechanism is coupled to the base member for rotating the same.

The ring-shaped base member may advantageously be formed to include a channel within an annular wall thereof for engaging the plurality of support rollers. The bottom surface of the ring-shaped base member is toothed and is engated by a drive gear coupled to the horizontal drive mechanism. The rollers which support the base member are secured to the skylight frame and may be adjustable in height to account for various dome heights of different skylights.

The circuitry for controlling the vertical and horizontal drive mechanisms includes first and second normally shaded photosensors mounted o the reflector for pivotal movement therewith. These first and second photosensors are shaded when the reflector is positioned so as to direct sunlight into the skylight. Movement of the sun to a higher angular elevation causes the first photosensor to receive direct rays of sunlight; similarly, movement of the sun to a lower angular elevation causes the second photosensor to receive direct sunlight. Circuitry coupled between the first and second photosensors and the vertical drive mechanism causes the reflector to be pivoted upwardly when the first photosensor receives direct sunlight and to be pivoted downwardly when the second photosensor receives direct sunlight, thereby maintaining the reflector at the proper elevation.

A third photosensor is also provided for controlling the horizontal drive mechanism. The third photosensor is normally shaded when the reflector extends generally toward the sun. Westerly movement of the sun causes direct sunlight to subsequently strike the third photosensor. Circuitry coupled between the third photosensor and the horizontal drive mechanism causes the base member to be rotated in a westerly direction until the third photosensor is again shaded, thereby causing the reflector to once again extend generally toward the sun.

Preferably, a fourth photosensor is also provided for generally sensing darkness due to either the setting of the sun or heavy overcast conditions. Circuitry coupled between the fourth photosensor and the vertical and horizontal drive mechanisms causes the reflector to be pivoted to its closed position and causes the base member to be rotated to an eastwardly facing direction to await sunrise on the following day. A fail safe switch or other sensor may be used to prevent the horizontal drive mechanism from rotating substantially beyond a westwardly facing direction at the end of the day. In addition, a switch or other sensor may be provided to indicate that the base member has been rotated back to the full east position in order to terminate the operation of the horizontal drive mechanism when readying the reflector assembly for sunrise on the following day.

In addition, a vertical limit switch or similar sensor may be coupled to or engaged with the reflector for indicating that the reflector has been pivoted upwardly to a predetermined angular elevation (i.e., a fully opened position). Circuitry coupled to this switch or sensor and responsive thereto prevents the vertical drive mechanism from further pivoting the reflector upwardly; in this manner, reflection of midday summer sunlight into the skylight may be avoided, and the reflector may even serve to shade a portion of the skylight from direct rays of overhead sunlight. An additional switch or sensor may also be coupled to or engaged with the reflector for indicating that the reflector has been pivoted to its fully closed position and thereafter preventing the vertical drive mechanism from attempting to further pivot the reflector downwardly.

A user-controller switch situated within the space illuminated by the skylight selectively allows the reflector assembly to operate under the automatic controls described above or to alternatively cause the reflector to be pivoted to its fully-closed position, to cause the base member to be rotated to its full east position, and to subsequently disable the vertical and horizontal drive mechanisms until the user again wishes to utilize the skylight.

BRIEF DESCRIPTION OF THE DRAWINGS

FIG. 1 is a perspective view of the tracking skylight reflector assembly rotatably supported above a conventional domed skylight.

FIG. 2 is a side view of the reflector assembly shown in FIG. 1 and illustrating the vertical drive mechanism.

FIG. 9 is a cross-sectional view of the ring-shaped base member taken through the plane indicated by lines 9—9 in FIG. 1 and illustrating the manner in which the horizontal drive motor causes the ring-shaped base member to rotate.

DETAILED DESCRIPTION OF THE PREFERRED EMBODIMENT

Figure 3:
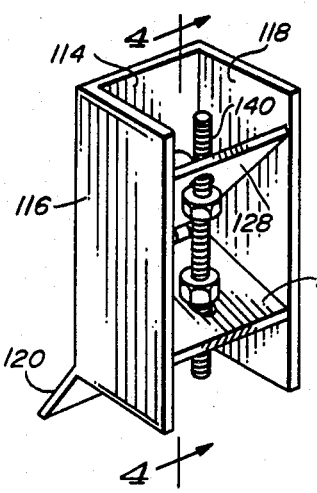
FIG. 3 is a perspective view of a shaded photosensor assembly used to control upward and downward pivotal movement of the reflector in order to track the sun.

With reference to FIG. 1, a tracking skylight reflector assembly constructed according to the teachings of the present invention, and designated generally by reference numeral 16, is shown detachably mounted over a conventional skylight, designated generally by reference numeral 18. Within FIG. 1, skylight 18 is shown having a generally square frame formed by skylight frame members 20, 22, 24, and 26. Typically, such skylight frame members are made of extruded aluminum material. Though skylight 18 is shown in the form of a square within FIG. 1, it should be understood by those skilled in the art that the present invention may be utilized in conjunction with circular or rectangular skylights. Supported within frame side members 20-26 is a light transmissive panel 28 which typically takes the form of an outwardly extending dome to facilitate water drainage therefrom. However, reflector assembly 16 may be used equally well with skylights incorporating an essentially flat light transmissive panel.

Still referring to FIG. 1, reflector assembly 16 includes a base member in the form of a ring 30. Ring 30 is preferably made of molded clear polycarbonate material. Polycarbonate material has the advantage of relatively low cost, high strength despite its lightness in weight, and immunity to ultraviolet radiation and other adverse weather conditions. In addition, polycarbonate ring 30 may be made essentially transparent to prevent significant interference with sunlight which would otherwise directly strike light transmissive panel 28 of skylight 18 were reflector assembly 16 omitted; were ring 30 opaque, it would cast a shadow upon light transmissive panel 28.

Figure 7:
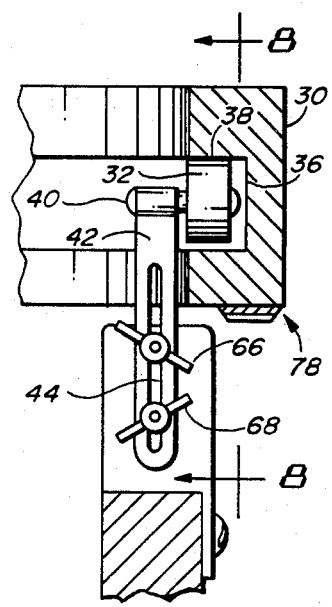
FIG. 7 is a cross-sectional view showing a support roller engaging a channel within the ring-shaped base member in order to rotatably support the same, and is taken through a plane indicated by lines 7—7 shown in FIG. 7.
Figure 8:
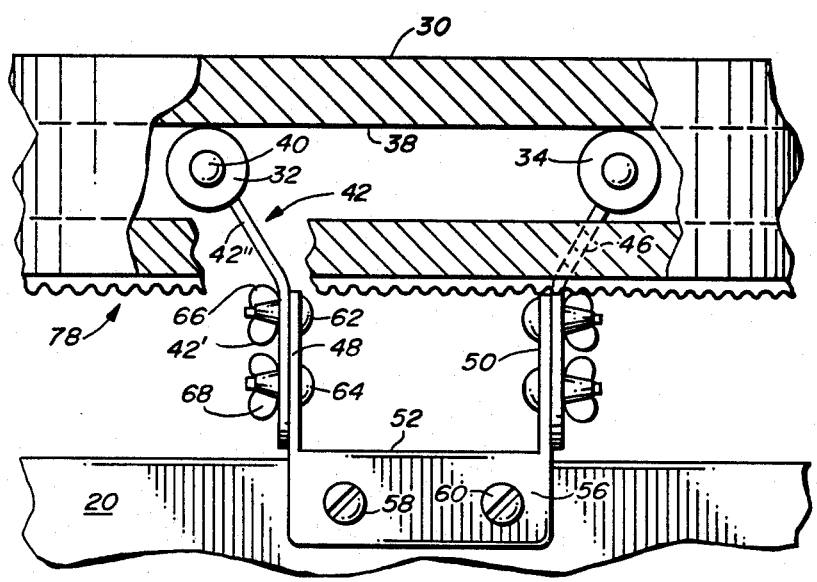
FIG. 8 is a cross-sectional view of the support rollers and ring-shaped base member taken through the plane indicated by lines 8—8 shown in FIG. 7.

Ring 30 is rotatably supported immediately above skylight 18 by a plurality of rollers, such as rollers 32 and 34 shown in FIGS. 7 and 8. Such rollers allow ring 30 to rotte about an axis substantially perpendicular to the center of light transmissive panel 28 of skylight 18. As shown in FIGS. 7 and 8, ring 30 is formed to include a channel 36 within the inner annular wall thereof. Channel 36 includes an upper, horizontal surface 38, and roller 32 extends within channel 36 and supportingly engages upper surface 38 thereof.

Roller 32 is supported by an axle 40 which in turn is supported by an angled support member 42. As shown best in FIG. 8, support member 42 includes an essentially vertically oriented lower portion 42' and an upper portion 42" extending approxximately 45 degrees to the vertical. Lower portion 42' includes a vertically oriented slot 44 for allowing the passage of bolts therethrough. Roller 34 is supported by a similar angled support member 46. The angled portions of support members 42 and 46 extend in opposing directions for increasing the stability of ring 30.

The lower portions of support members 42 and 46 are secured to opposing first and second vertical portions 48 and 50, respectively, of U-shaped bracket 52. Bracket 52 includes a horizontal portion 54 (see FIG. 1) which extends over the upper face of skylight frame member 20, as well as a downwardly extending flange 56 extending parallel and adjacent to the vertical face of skylight frame member 20 and being secured thereto by screws 58 and 60. Since no holes need be drilled into the upper face of skylight frame member 20 when securing U-shaped bracket 52 thereto, the skylight frame remains essentially water-tight. Support members 42 and 46, and U-shaped bracket 52 may all be formed of aluminum angle metal for strength and durability.

Still referring to FIGS. 7 and 8, support member 42 is secured to vertical portion 48 of U-shaped brakcet 52 by a pair of bolts 62 and 64 and associated wing nuts 66 and 68, respectively. Bolts 62 and 64 extend through holes drilled within vertical portion 48 and through slot 44 within lower portion 42'; accordingly, the height at which ring 30 is supported above the skylight frame may be adjusted by loosening wing nuts 66 and 68, positioning support member 42 at the desired height, and retightening wing nuts 66 and 68. A similar adjustment is made to support member 46. In this manner, the height of ring 30 above the skylight frame may easily be adjusted. As will be explained in greater detail below, this feature of the present invention allows the reflector assembly to be used with skylights having domes of various heights while preventing the reflector panel of reflector assembly 16 from striking the dome when the reflector panel is pivoted to its closed position overlying the upper face of ring 30.

As shown in FIG. 1, a support bracket identical to support bracket 52 is positioned upon the central portion of skylight frame members 22, 24 and 26 for providing a stable but rotatable support for ring 30.

According to the present invention, a horizontal drive mechanism must be provided to rotate ring 30 for allowing reflector assembly 16 to track east-to-west movement of the sun. Accordingly, a horizontal drive motor 72 is disposed within U-shaped support bracket 70 as shown in FIGS. 1 and 9. Preferably, U-shaped bracket 70 and skylight frame member 22 to which it is secured are located on the north side of the skylight so that horizontal drive motor 72 does not significantly interfere with sunlight directed toward skylight 18, and so that the leads 74 coupled to horizontal drive motor 72 are conveniently located for harnessing together with various other control wires.

The drive shaft of horizontal drive motor 72 is disposed horizontally and extends radially outward from the center of skylight 18. Drive gear 76 is secured to the end of the drive shaft of horizontal drive motor 72 for rotating ring 30. As shown in FIG. 8, the lower face of ring 30 is formed as a toothed surface 78, the teeth of which mesh with drive gear 76. Horizontal drive motor 72 is preferably a low voltage, D.C. reversible motor; accordingly, ring 30 may be rotated in either direction depending upon the direction in which horizontal drive motor 72 is operated. A low voltage D.C. motor is preferred for the reason that risks of electrical shock during installation and fire hazards following installation are substantially minimized. The specific manner in which horizontal drive motor 72 is controlled is described in greater detail below.

As mentioned above, the brackets and support members (42, 46, 56) to which the rollers (32, 34) are secured for rotatably supporting ring 30 are adjustable in height. However, if ring 30 is raised significantly, toothed surface 78 thereof may be lifted out of engagement with drive gear 76. Accordingly, shims, or other suitable height adjustment means, are utilized in conjunction with the mounting of horizontal drive motor 72 to U-shaped bracket 70 in order to maintain drive gear 76 in engagement with toothed surface 78 of ring 30.

Again referring to FIG. 1, reflector assembly 16 includes a reflector panel 80 pivotally coupled to the upper face of ring 30 substantially along one side thereof for allowing reflector 80 to be pivoted from a closed position overlying the upper face of ring 30 to an opened position for reflecting sunlight received by reflector 80 through light transmissive panel 28 of skylight 18. As shown in FIG. 1, reflector 80 is in the form of a square panel having dimensions commensurate with skylight 18. In the preferred embodiment of the invention, reflector panel 80 is made of twin-walled polycarbonate sheet material of the type commercially available from Rohm & Haas Corporation. Such twin-walled polycarbonate sheet material is relatively immune to ultraviolet radiation and adverse weather conditions. The surface of reflector 80 closest to the dome of skylight 18 is covered by a thin layer of reflective material such as solar reflecting film of the type sold under the trademark SCOTHCAL by 3M Corporation. The upper surface of reflector panel 80 may be appropriately braced by lengths of solid polycarbonate material extending diagonally from opposite corners of reflector panel 80 to reinforce the same and to provide a solid support at the center thereof for mounting a vertical drive motor to be described below. In addition, aluminum edge strips 82, 84, 86 and 88 are screwed to the four side edges of reflector panel 80. As can be seen from FIG. 1, each such edge strip is generally U-shaped for overlapping and underlapping the upper and lower faces, respectively, of reflector panel 80. The lower rear edge of reflector panel 80, to which edge strip 88 is secured, is pivotally coupled to the upper face of ring 30 by hinges 90 and 92.

The present invention contemplates means for pivotally raising and lowering reflector panel 80 to track movements in the angular elevation of the sun. With reference to FIGS. 1 and 2, such a vertical drive means is provided by a vertical drive motor 94 and a pair of rack arms 96 and 98. As shown in FIG. 2, the lower end of rack arm 96 is pivotally secured to ring 30 by a pivot pin 100. Pivot pin 100 may be secured directly to ring 30 or to a small block of solid polycarbonate material cemented to the outer annular wall of ring 30. Rack arms 96 and 98 each include a toothed surface extending along the upwardly facing surfaces thereof, such as that designated 102 in FIGS. 1 and 2. In contrast, the downwardly facing surfaces of rack arms 96 and 98 (i.e., surface 104 in FIG. 2) are relatively smooth. Toothed surface 102 of rack arm 96 is adapted to mesh with a drive gear 106 which, upon rotation, travels along toothed surface 102 of rack arm 96. Drive gear 106 is in turn affixed to the end of a drive shaft 108 coupled to vertical drive motor 94. To maintain gear 106 engaged with toothed surface 102 of rack arm 96, a sleeve 110 supportingly engages the smooth downwardly facing surface 104 of rack arm 96 and slides therealong as gear 106 travels along toothed surface 102. Sleeve 110 is pivotally coupled to drive shaft 108 for allowing sleeve 110 to pivot relative to reflector panel 80 as reflector panel 80 is pivoted upwardly or downwardly.

Vertical drive motor 94 is also preferably a low voltage D.C. reversible motor but having a drive shaft take-off extending from opposing sides of the motor. A first power take-off is coupled to drive shaft 108 for rotating gear 106. The second power take-off extending from the opposite side of vertical drive motor 94 is coupled to a like drive shaft for rotating a corresponding drive gear (not shown) engaged with the toothed surface of rack arm 98 in an identical manner. A bearing pillar block, such as that designated by reference numeral 112 in FIG. 2, may be provided adjacent edge strips 82 and 86 upon the upper side of reflector panel 80 for further supporting drive shaft 108 and the like drive shaft extending in the opposite direction from vertical motor 94. Vertical drive motor 94 itself is secured to the upper surface of reflector panel 80 at approximately the center point thereof, corresponding to the intersection of the diagonally extending braces (not shown) described above.

In an alternate embodiment of the present invention, vertical drive motor 94 and bearing pillar block 112 are eliminated, and two distinct vertical drive motors are provided, one adjacent drive gear 106 and a second provided adjacent the like drive gear (not shown) engaged with the toothed surface of rack arm 98. In this embodiment, the two distinct vertical drive motors are operated in tandem to raise and lower reflector 80; preferably, such vertical drive motors are electrically coupled in series with one another to prevent either motor from attempting to move reflector 80 when the other such motor has failed. Since each vertical drive motor is located adjacent its corresponding drive gear, the need for intermediate bearing pillar blocks and elongated drive shafts is eliminated.

With reference to FIG. 2, it can be seen that as vertical drive motor 94 rotates in a clockwise direction, drive gear 106 moves along toothed surface 102 generally toward pivot pin 100; in turn, reflector panel 80 is pivoted downwardly about hinges 90 and 92 until it eventually assumes a fully closed position overlying ring 30, as shown by dashed lines 80. When reflector panel 80 is in the fully closed position, rack arms 96 and 98 extend substantially parallel with reflector panel 80, as shown by dashed lines 96 within FIG. 2. When in the fully closed position, reflector 80 substantially shades skylight 18 from any available outdoor light and serves as added protection for light transmissive panel 28 in the event of a hail storm or other severe weather conditions.

The present invention further relates to the provision of a control mechanism for controlling horizontal drive motor 72 and vertical drive motor 94 so as to track daily and seasonal movements of the sun; the control mechanism is further operative to shut down and recycle the reflector assembly at the end of each day, under adverse weather conditions, or at the request of the user occupying the space illuminated by the skylight. The preferred embodiment of such a control mechanism is generally described below.

Figure 4:
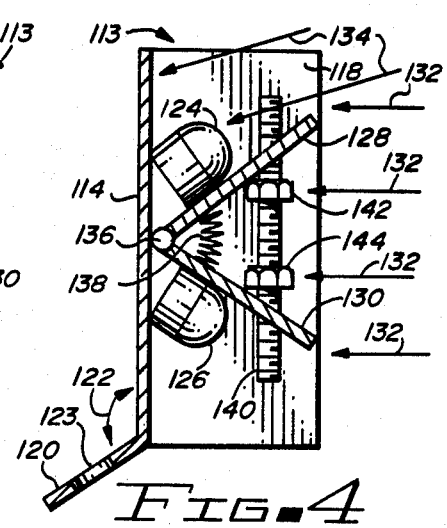
FIG. 4 is a cross-sectional view of the shaded reflector assembly taken through a plane indicated by lines 4—4 in FIG. 3.

First, referring to the apparatus for controlling the operation of vertical drive motor 94, first and second photosensors and an associated shade mechanism are provided, as shown in FIGS. 3 and 4. The shade mechanism includes a U-shaped channel member having a rear wall 114 and a pair of side walls 116 and 118 extending forwardly therefrom and approximately perpendicular thereto. Mounting flange 120 extends at an angle 122 downwardly and rearwardly from the lower portion of rear wall 114 and is provided with a mounting hole 123 to facilitate mounting of the shade mechanism and associated photosensors upon reflector panel 80 in a manner to be described below.

Referring to FIGS. 3 and 4, first and second photosensors 124 and 126 are mounted within the shade mechanism as by attachment to rear wall 114. Such photosensors may be conventional phototransistors. A first shade panel 128 extends outwardly from rear wall 114 and is disposed adjacent to and in front of first photosensor 124. A second shade panel 130 extends generally forward and downward from rear wall 114 and is disposed adjacent to and in front of photosensor 126. As illustrated by arrows 132 within FIG. 4, shade panels 128 and 130 shade photosensors 124 and 126 from direct rays of sunlight impinging from a direction perpendicular to rear wall 114. However, assuming that the angular elevation of the sun is increased, as represented by arrows 134 in FIG. 4, then direct rays of sunlight may strike photosensor 124.

Shade mechanism 113 and photosensors 124 and 126 are used to control vertical drive motor 94 in the following manner. As shown in FIG. 1, shade mechanism 113 is mounted to the upper surface of reflector panel 80 adjacent the upper, forward edge thereof. Assuming that reflector panel 80 is initially closed over ring 30, morning sunlight passes over shade panel 128 and directly strikes photosensor 124. Circuitry to be described in greater detail below is responsive to the receipt of direct sunlight by photosensor 124 for causing vertical drive motor 94 to pivot reflector panel 80 upwardly. After reflector panel 80 has been pivoted upwardly to an extent sufficient to reflect morning sunlight into skylight 18, rear wall 114 of shade mechanism 113 will extend substantially perpendicular to the impinging rays of sunlight. In this event, photosensor 124 will no longer receive direct sunlight, and hence vertical drive motor 94 is stopped. As the angular elevation of the sun continues to increase until noon, photosensor 124 will again receive direct sunlight and will again cause reflector 80 to be pivoted upwardly until photosensor 124 is again shaded. Were rear wall 114 of shade mechanism 113 to extend perpendicular to reflector panel 80, then the vertical drive motor would maintain reflector 80 parallel to the impinging rays of direct sunlight and prevent it from reflecting significant amounts of sunlight into skylight 18. For this reason, angle 122 (see FIG. 4) must be in excess of 90 degrees.

As the angular elevation of the sun decreases into the afternoon hours, photosensor 126 is eventually struck by direct sunlight and causes vertical drive motor 94 to again be actuated, but in the reverse direction, thereby pivoting reflector panel 80 downwardly until photosensor 126 is again shaded from direct sunlight and rear wall 114 is again substantially perpendicular to the impinging rays of sunlight. Those skilled in the art will appreciate that the condition wherein photosensors 124 and 126 are simultaneously shaded corresponds to a quiescent state indicating that reflector panel 80 is properly positioned relative to the angular elevation of the sun.

In a preferred embodiment of the present invention, the position of shade panels 128 and 130 may be adjusted for optimizing the performance and sensitivity of the vertical drive motor control mechanism. As shown in FIGS. 3 and 4, shade panels 182 and 130 may be hinged by a hinge pin 136 to rear wall 114. Spring 138 extends between shade panels 128 and 130 and tends to pull such shade panels toward one another. Slots may be formed within panels 128 and 130 for receiving a threaded rod 140. Nuts 142 and 144 are threaded over rod 140 and are disposed between shade panels 128 and 130 for separating the same by an adjustable distance. In this manner, the sensitivity of the vertical tracking mechanism may easily be adjusted.

Vertical drive motor 94 is preferably controlled by two components in addition to photosensors 124 and 126. With reference to FIG. 2, a microswitch 146 is secured to the top surface of reflector panel 80 near the lowermost edge thereof. A support bracket 148 extends vertically upward from ring 30 and is provided with a threaded hole for threadedly engaging a bolt 150. As shown in FIG. 2, the end of bolt 150 opposite the head portion thereof extends generally toward the depressible switch member of microswitch 146 and depresses the same when reflector panel 80 has been pivoted upwardly through a predetermined angle. The aforementiond predetermined angle may be varied by threadedly advancing or retracting bolt 150. Microswitch 146 thereby serves to sense that reflector panel 80 has been pivoted upwardly to a fully opened position and is operative to a limit any further upward pivotal movement of reflector panel 80. This feature of the present invention is particularly useful for limiting amounts of sunlight reflected into skylight 18 during the middle portion of summer days when the sun is at a relatively high angular elevation. After the sun has reached an angular elevation whereby rays of sunlight extend substantially parallel to reflector panel 80, reflector panel 80 ceases to reflect any sunlight into skylight 18 in addition to that which strikes light transmissive panel 28 directly. If the sun rises to a still higher angular elevation, then reflector panel 80 actually serves to shade a portion of light transmissive panel 28 from direct sunlight which would otherwise strike light transmissive panel 28 were reflector assembly 16 not utilized. In this manner, excessive amounts of light and heat gain through skylight 18 during the middle portion of summer days may be avoided.

An additional component which serves to help control vertical drive motor 94 is microswitch 152, shown in FIG. 1 as being mounted to the upper surface of reflector panel 80 adjacent the frontmost edge thereof and including a depressible switch member 154 extending through a hole formed within reflector panel 80 and edge strip 84. As reflector panel 80 is pivoted downwardly to its fully closed position, depressible switch member 154 engages and is eventually depressed by the upper face of ring 30. Hence, microswitch 152 serves to sense that reflector panel 80 has been pivoted downwardly to its fully closed position. Upon detection by microswitch 152 that reflector panel 80 has been pivoted to its fully closed position, further operation of vertical drive motor 94 for movement in the downward direction is inhibited.

Figure 5:
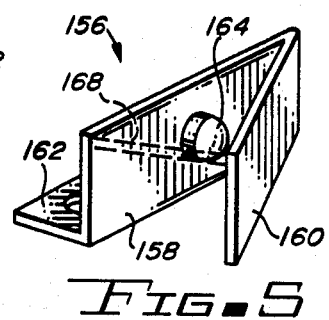
FIG. 5 is a perspective view of a shaded photosensor used to control horizontal movement of the reflector assembly in order to track east-to-west movement of the sun.
Figure 6:
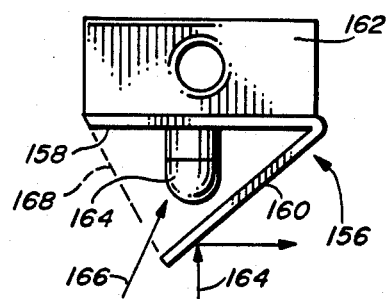
FIG. 6 is a top view of the photosensor assembly shown in FIG. 5.

As described above, a mechanism must also be provided for controlling operation of horizontal drive motor 72 for allowing reflector assembly 16 to track east-to-west movements of the sun. FIGS. 5 and 6 illustrate one embodiment of a horizontal tracking mechanism suitable for this purpose. A shade mechanism designated generally by reference numeral 156 includes a rear wall 158 and a front wall 160 forming a V therewith. Assuming that rear wall 158 initially faces toward the east, then the V formed by rear wall 158 and front wall 160 opens toward the south. Mounting flange 162 extends perpendicularly from the lower edge of rear wall 158 and is directed behind rear wall 158. A third photosensor 164 is mounted to rear wall 158. As shown in FIG. 6, front wall 160 shades photosensor 164 from rays of sunlight directed substantially perpendicular to rear wall 158, symbolized by arrow 164 within FIG. 6. However, east-to-west movement of the sun eventually results in the rays of sunlight being directed around front wall 160 and striking photosensor 164, as symbolized by arrow 166 within FIG. 6.

Shade mechanism 156 and photosensor 164 are used to control horizontal drive motor 72 in the following manner. As shown in FIG. 1, shade mechanism 156 is mounted to the upper surface of reflector panel 80 near the frontmost edge thereof. Shade mechanism 156 is mounted so as to maintain rear wall 158 substantially parallel with edges 84 and 88 of reflector panel 80. When reflector panel 80 extends generally toward the sun, then front wall 160 shades photosensor 164 from direct rays of sunlight. Subsequent east-to-west movement of the sun ultimately causes rays of direct sunlight to pass beyond front wall 160 and strike photosensor 164. In this event, horizontal drive motor 72 is actuated to rotate ring 30, and reflector panel 80 pivotally coupled thereto, in a clockwise direction (with reference to FIG. 1) until front wall 160 once again shades photosensor 164. In this manner, reflector panel 80 is always maintained in proper east-west relationship with respect to the position of the sun.

Referring again to FIGS. 5 and 6, an optional top wall 168 is indicated in dashed lines and extends between the upper edges of rear wall 158 and front wall 160. Top wall 168 may be useful to prevent sunlight from passing over the upper edge of front wall 160 and directly striking photosensor 164 in cases where reflector panel 80 is temporarily at too low of an angular elevation.

At the end of each day, reflector assembly 16 must be rotated to a position from which it may commence operation on the following morning. Accordingly, the present invention provides means for returning reflector assembly 16 to an eastwardly facing direction, or full-east position, at the end of each day. Preferably, the return of reflector assembly 16 to the full-east position is accomplished by rotating ring 30 in a counterclockwise direction (with reference to FIG. 1) rather than by continuing to rotate ring 30 through a full clockwise revolution. Complete clockwise revolution of ring 30 would cause the wiring harness (not shown) coupled to vertical drive motor 94, photosensors 124, 126, and 164, and microswitches 146 and 152, to become twisted and tangled about reflector assembly 16.

In the preferred embodiment of the present invention, a fourth, unshaded photosensor 170 is mounted to the upper surface of reflector panel 80 adjacent shade mechanism 113 and 156 as shown in FIG. 1 for sensing the amount of available sunlight. If photosensor 170 senses darkness, as might be caused by sunset or heavy overcast conditions, horizontal drive motor 72 is actuated for rotating ring 30 back toward the full-east position. In addition, vertical drive motor 94 may be simultaneously actuated to pivot reflector panel 80 downwardly toward its fully closed position. A full-west limit microswitch 172, shown in FIG. 1 mounted to skylight frame member 24, may be provided in addition to darkness photosensor 170 for positively preventing ring 30 from being rotated appreciably beyond a full-west position by inhibiting horizontal drive motor 72 from further operation tending to rotate ring 30 clockwise. In order to actuate microswitch 172, a tab 174 may extend radially outward from the outer annular wall of ring 30. When ring 30 has been rotated to, or slightly beyond, its full-west position, tab 174 engages microswitch 172 for preventing further clockwise movement of ring 30. Those skilled in the art will appreciate that microswitch 172 must be spaced from ring 30 by a distance in excess of the length of pivot pin 100 to prevent pivot pin 100 or rack arm 96 from engaging microswitch 172; correspondingly, tab 172 must extend from ring 30 by a distance sufficient to engage microswitch 172.

A full-east limit microswitch 176 is mounted to eastwardly facing skylight frame member 26 and cooperates with the above described tab 174 for indicating that ring 30 has been returned to its full-east position. Upon being actuated by tab 174, microswitch 176 prevents further operation of horizontal drive motor 72 tending to rotate ring 30 in the counterclockwise direction (with reference to FIG. 1). Accordingly, reflector assembly 16 is stopped in an eastwardly facing direction in readiness for sunrise on the following day.

Figure 10:
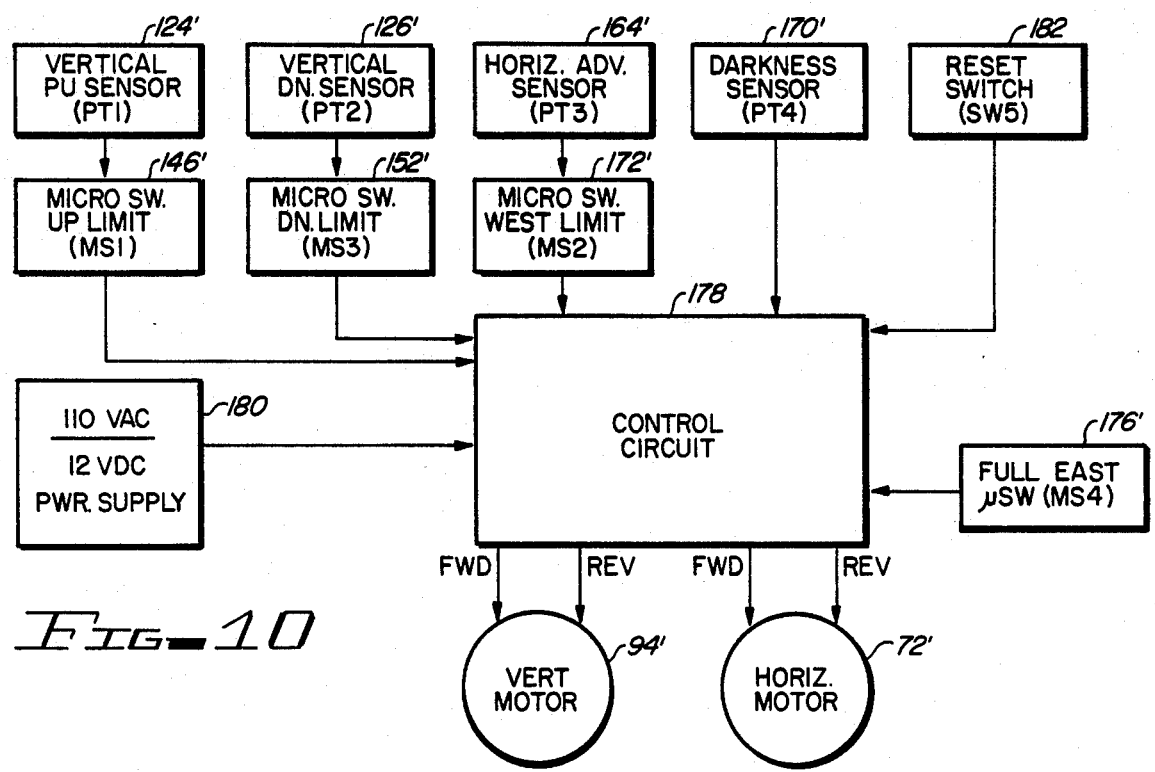
FIG. 10 is a simplified block diagram illustrating the manner in which various sensors and switches are coupled to control circuitry for operating the vertical drive motor and the horizontal drive motor.

FIG. 10 illustrates in block diagram form the various components used to control horizontal drive motor 72 and vertical drive motor 94. Those components illustrated in FIG. 10 which correspond to sensors or microswitches described above are designated by a correspondingly primed reference numeral. Within FIG. 10, a control circuit 178 is coupled between the various control components and horizontal drive motor 72' and vertical drive motor 94' for selectively actuating such motors in the forward or reverse directions. Within FIG. 10, it will be noted that up limit microswitch 146' selectively prevents vertical up photosensor 124' from causing further actuation of vertical drive motor 94' tending to pivot reflector panel 80 upwardly beyond its fully opened position. Similarly, down limit microswitch 152' selectively prevents vertical down photosensor 126' from causing further actuation of vertical drive motor 94' in a direction tending to pivot reflector panel 80 downwardly beyond its fully closed position. West limit microswitch 172' selectively prevents horizontal advance photosensor 164' from causing further actuation of horizontal drive motor tending to rotate ring 30 in a clockwise direction beyond its full-west position. The box designated 180 within FIG. 10 symbolically illustrates a power supply shown schematically in FIG. 11B.

The box labeled "reset switch" and designated by reference numeral 182 within FIG. 10 corresponds to a user operated switch disposed in a convenient location within the interior space being illuminated by the skylight. Reset switch 182 allows the user to selectively enable the automatic tracking mode of operation of reflector assembly 16 as described above, or alternatively, to shut down reflector assembly 16 and to disable further operation thereof until such time as the user again wishes to utilize the skylight. For example, the user may wish to darken the interior space several hours before sunset. In this event, the user could toggle the reset switch to actuate vertical drive motor 94' to return reflector panel 80 to its fully closed position and to simultaneously actuate horizontal drive motor 72' to return ring 30 to its full-east position in readiness for operation on the following day. Alternatively, the user may wish to maintain the interior space darkened for several hours after sunrise. In this event, the user could actuate the reset switch on the preceding evening to disable the vertical and horizontal drive motors until such time as the user desired to illuminate the interior space, at which time the user would toggle reset switch 182. Such a reset switch, together with the other operative components shown in FIG. 10, are shown schematically within FIG. 11A.

Figure 11B:
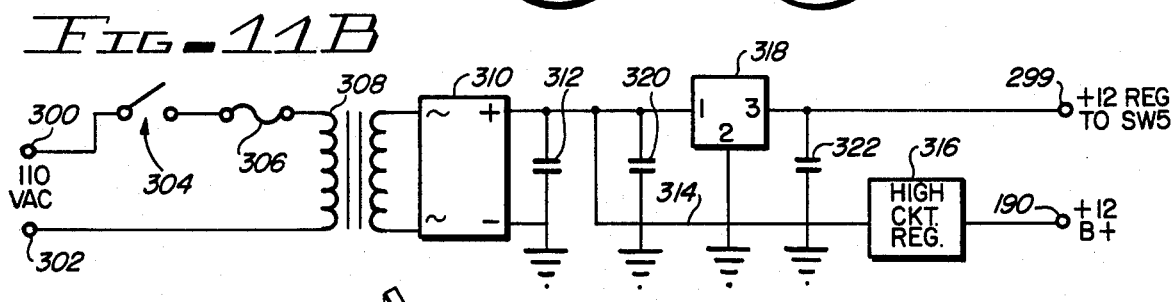
FIG. 11B is a circuit schematic of a power supply which may be used in conjunction with the circuitry shown in FIG. 11A.
Figure 11A:
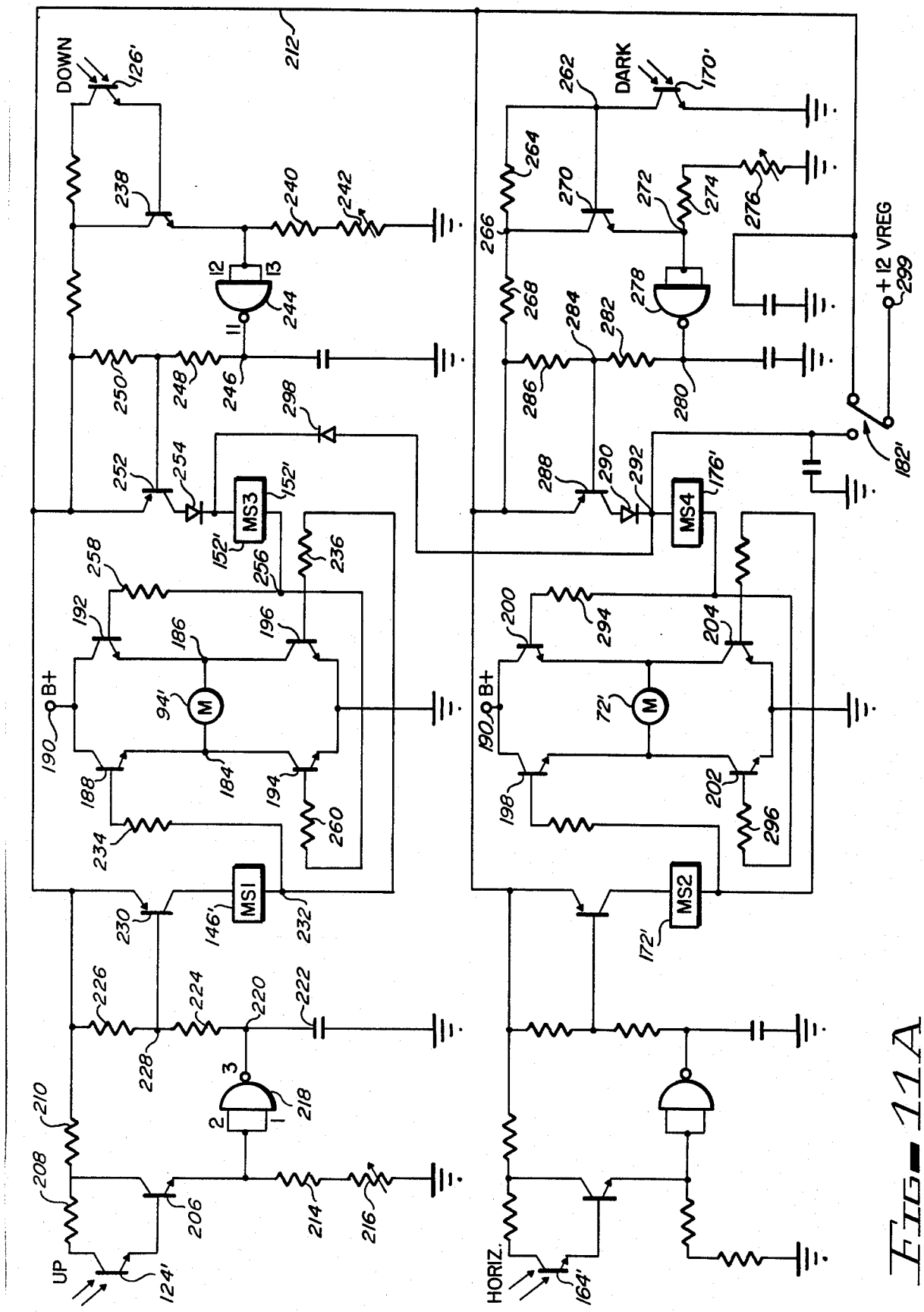
FIG. 11A is a detailed circuit schematic corresponding to the components represented within FIG. 10.

Referring now to FIG. 11A, those components corresponding to photosensors, microswitches, or motors described above are designated by correspondingly primed reference numerals. In particular, phototransistor 124' corresponds to vertical up photosensor 124; phototransistor 126' corresponds to vertical down photosensor 126; phototransistor 164' corresponds to horizontal advance photosensor 164; phototransistor 170' corresponds to darkness phototransistor 170; microswitch 146' corresponds to up limit microswitch 146; microswitch 152' corresponds to down limit microswitch 152; microswitch 172' corresponds to full-west microswitch 172; microswitch 176' corresponds to full-east microswitch 176; switch 182' corresponds to reset switch 182 (see FIG. 10); motor 72' corresponds to horizontal drive motor 72; and motor 94' corresponds to vertical drive motor 94.

First and second leads of vertical drive motor 94' are coupled to nodes 184 and 186, respectively. Power transistor 188 has its emitter and collector terminals coupled in series between node 184 and +12 volt D.C. supply terminal 190, respectively. Similarly, power transistor 192 has its emitter and collector terminals coupled in series between node 186 and supply terminal 190, respectively. Power transistor 194 has its collector and emitter terminals coupled in series between node 184 and ground, respectively; similarly, transistor 196 has its collector and emitter terminals coupled in series between node 186 and ground, respectively.

Those skilled in the art will appreciate that, by simultaneously enabling transistors 188 and 196, current may flow in a first direction through vertical drive motor 94' for causing the reflector panel to be pivoted upwardly. On the other hand, by simultaneously enabling transistors 192 and 194, current may flow in the opposite direction through vertical drive motor 194' for causing reflector panel 80 to be pivoted downwardly. Power transistors 198, 200, 202, and 204 are coupled to horizontal drive motor 72' in an identical manner to that described immediately above with regard to vertical drive motor 94'.

Power transistors 188 and 196 are enabled by phototransistor 124' in a manner now to be described. Upon receiving direct sunlight, phototransistor 124' is rendered conductive, and the emitter of phototransistor 124' supplies base current drive to transistor 206. The collector terminals of phototransistor 124' and transistor 206 are supplied with collector current from series coupled resistors 208 and 210, in turn coupled to a +12 volt regulated D.C. power supply conductor 212. Whenever transistor 206 is rendered conductive, the emitter current conducted thereby creates a voltage drop across fixed resistor 214 and variable resistor 216 coupled in series between the emitter of transistor 206 and ground. The positive voltage created at the emitter terminal of transistor 206 is coupled to both inputs of an open collector type NAND gate 218, the output of which is coupled to node 220. Capacitor 222 extends between node 220 and ground, and series coupled resistors 224 and 226 extend between node 220 and regulated supply rail 212. Resistors 224 and 226 are joined at node 228 which is in turn coupled to the base of PNP transistor 230.

Again assuming that phototransistor 124' is receiving direct sunlight, then the positive voltage level established at the emitter of transistor 206 causes the output of NAND gate 218 to provide a low impedance path to ground, thereby causing a voltage drop across resistor 226 sufficient to bias transistor 230 into conduction. The emitter and collector terminals of transistor 230 are coupled between regulated supply rail 212 and a first switch contact of normally closed microswitch 142', respectively. The second contact of microswitch 146' is coupled to node 232 which is in turn coupled by resistors 234 and 236 to the base terminals of power transistors 188 and 196, respectively, for supplying base current drive thereto.

On the other hand, if phototransistors 124' is shaded from direct sunlight, then it and transistor 206 are rendered non-conductive, and the voltage at the emitter of transistor 206 is essentially ground. Accordingly, the output of NAND gate 218 is essentially a high impedance. Consequently, node 228 is pulled to the regulated supply voltage and transistor 230 is rendered non-conductive. Therefore, no base current drive is supplied to power transistors 188 and 196. Furthermore, if microswitch 146' is opened due to reflector panel 80 reaching its fully opened position, then transistor 230 is prevented from supplying any further base current drive to power transistors 188 and 196, even when phototransistor 124' is receiving direct sunlight. The circuitry coupling horizontal advance phototransistor 164' to power transistors 198 and 204 is identical to the circuitry immediately described above, and hence will not be further described herein.

Still referring to FIG. 11A, the circuitry coupling vertical down phototransistor 126' to power transistor 192 and 194 is similar to that described with reference to vertical up phototransistor 124'. Phototransistor 126', upon receiving direct sunlight, supplies base current drive to transistor 238 which, in turn, conducts emitter current through fixed resistor 240 and variable resistor 242 for creating a positive voltage at the emitter of transistor 238. The emitter of transistor 238 is coupled to both inputs of open collector type NAND gate 244, the output of which is coupled to node 246. Series coupled resistors 248 and 250 extend between node 246 and regulated supply rail 212. Again assuming that phototransistor 126' is receiving direct sunlight, NAND gate 244 inverts the positive level receives at its inputs and provides a low impedance path from its output to ground. The current conducted by the output of NAND gate 244 is sufficient to create a voltage drop across resistor 250 for biasing PNP transistor 252 into conduction. Collector current conducted by transistor 252 is coupled by diode 254 and by the normally closed contacts of microswitch 152' to node 256, which in turn is coupled by resistors 258 and 260 to the base terminals of power transistors 192 and 194, respectively, for enabling the same.

On the other hand, if phototransistor 126' is shaded, then phototransistor 126' and transistor 238 are each rendered non-conductive, and a ground level is presented to the inputs of NAND gate 244. Consequently, the output of NAND gate 244 assumes a high impedance state, and no voltage drop is created across resistor 250. Transistor 252 is then rendered non-conductive, and it therefore can not supply base current drive to power transistors 192 and 194. In the event that microswitch 152' becomes opened due to the reflector panel 80 assuming its fully closed position, transistor 252 is prevented from supplying base current drive to power transistors 192 and 194, even if phototransistor 126' receives direct sunlight.

Still referring to FIG. 11A, phototransistor 170', corresponding to darkness photosensor 170, has its emitter terminal coupled to ground and its collector terminal coupled to node 262. Resistor 264 is coupled between node 262 and 266, and resistor 268 is coupled from node 266 to regulated supply rail 212. Node 262 is also coupled to the base terminal of transistor 270, the collector terminal of which is coupled to node 266, and the emitter terminal of which is coupled to node 272. Node 272 is in turn coupled by fixed resistor 274 and variable resistor 276 to ground. In addition, node 272 is coupled to both inputs of an open collector type NAND gate 278, the output terminal of which is coupled to node 280. Node 280 is coupled by resistor 282 to node 284, and node 284 is in turn coupled by resistor 286 to regulated supply rail 212. In addition, node 284 is coupled to the base of PNP transistor 288.

Typically, during daylight hours, phototransistor 170' receives a sufficient amount of light to render it conductive, thereby creating a low voltage at node 262 and rendering transistor 270 non-conductive. Consequently, the voltage at node 272 is essentially ground. The ground level at node 272 causes the output of NAND gate 278 to assume a high impedance, thereby preventing a voltage drop from being created across resistor 286. Consequently, transistors 288 is rendered non-conductive and does not interfere with the normal control of the vertical and horizontal drive motors.

On the other hand, when phototransistor 170' receives relatively little light, it becomes non-conductive, and allows transistor 270 to become conductive. Node 272 is subequently pulled to a high level and results in the output of NAND gate 278 providing a low impedance path to ground. Consequently, a voltage drop is created across resistor 286 sufficient to render transistor 288 conductive. Collector current supplied by transistor 288 is coupled by diode 290 to node 292. Current is supplied from node 292 through normally closed microswitch 176' to the base terminals of power transistors 200 and 202 via resistors 294 and 296, respectively, for reversing the reflector assembly to the full-east position. Upon arriving at the full-east position, microswitch 176' opens, terminating the operation of horizontal drive motor 72'. Node 292 is also coupled by diode 298 to the junction between the cathode of diode 254 and the first contact of normally closed microswitch 152', and supplies base drive current to power transistors 192 and 194 for returning reflector panel 80 to its fully closed position. Those skilled in the art will appreciate that diode 298 provides isolation between the cathode of diode 254 and the cathode of diode 290 during instances when transistor 252 is rendered conductive.

Still referring to FIG. 11A, user operated reset switch 182' is normally maintained in the position shown in the figure for coupling the +12 volt regulated D.C. supply voltage to regulated voltage supply rail 212 in order to enable all of the control circuitry described above. However, in the event that the user wishes to shut down the reflector assembly and to subsequently disable the horizontal and vertical drive motors, the user toggles switch 182 to the left (with reference to FIG. 11A). This operation directly coupled the 12 volt supply voltage to node 292. As described above with regard to the function of darkness sensor 170', the application of power to node 292 causes the reflector assembly to assume its fully closed position and to return to its full-east position. However, if switch 182' is allowed to remain in the leftmost position, then no power is applied to regulated voltage supply rail 212; consequently, neither the receipt of direct sunlight by phototransistor 124' nor by phototransistor 164' is sufficient to operate either vertical drive motor 94' or horizontal drive motor 72'. Only when the user returns switch 182' to its rightmost position (with reference to FIG. 11A) can vertical drive motor 94' and horizontal drive motor 72' again be activated.

Referring now to FIG. 11B, the power supply for the circuitry of FIG. 11A includes input terminals 300 and 302 for receiving a conventional 110 volt alternating current source. Terminal 300 is coupled to power cut off switch 304 which is in turn coupled in series with one end of a fuse 306. The opposite end of fuse 306 is coupled through the primary winding of a transformer 308 to input terminal 302. The secondary coil of transformer 308 is coupled to the input terminals of a full wave rectified bridge circuit 310. The negative output terminal of bridge circuit 310 is coupled to ground, and the positive terminal is coupled by storage capacitor 312 to ground. The positive output terminal of bridge circuit 310 is also coupled by conductor 314 to the input of a high-current voltage regulator circuit 316, the output terminal of which is coupled to voltage supply terminal 190 for providing a somewhat regulated voltage used to operate the horizontal and vertical drive motors. The positive output terminal of bridge circuit 310 is also coupled to the input terminal of a conventional three terminal voltage regulator circuit 318, a second terminal of which is coupled to ground and the third, or output, terminal of which is coupled to low-curent regulated supply voltage terminal 299 for powering the control circuitry shown in FIG. 11A. Appropriate filter capacitors 320 and 322 are coupled from the input terminal and output terminal, respectively, of regulator circuit 318 to ground. In the preferred embodiment of the present invention, both the voltage provided at power supply terminal 190 and at regulated supply terminal 299 are approximately +12 volts D.C.

Figures 12, 13:
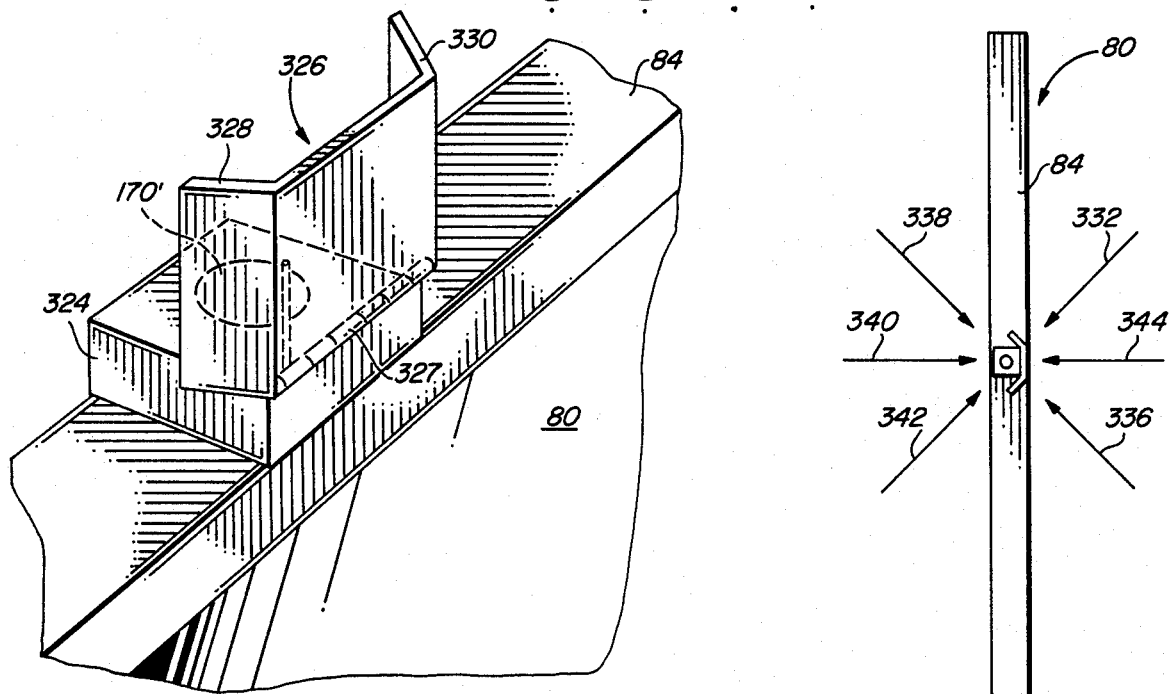
FIG. 12 is a perspective view of a wind sensing apparatus which may be used to return the reflector to its fully closed position in the event of dangerously high winds.
FIG. 13 is an edge view of the reflector and illustrates the manner in which the wind sensing apparatus of FIG. 12 is dependent upon wind direction.

At times when very high winds are prevalent despite sunny skies, it may be desirable to force reflector panel 80 to be lowered to its fully closed position, both to protect the integrity of the skylight reflector assembly and to shield the light transmissive panel of the skylight from wind blown objects. FIGS. 12 and 13 illustrate an apparatus which may be used to sense dangerously high wind conditions and to initiate operation of the vertical drive motor 94 to lower reflector panel 80 to its fully closed position. As shown in FIG. 12, darkness photosensor 170 (see FIG. 1) is positioned within a shallow box 324 mounted to the outwardly extending face of edge strip 84 of reflector panel 80. Shallow box 324 includes a hinged, spring action lid 326 pivotally secured by hinge 327 to the edge of shallow box 324 which lies closest to the skylight when reflector panel 80 is lowered to its fully closed position. Hinged lid 326 includes a pair of deflectors 328 and 330 which extend from opposing side edges thereof. Deflectors 328 and 330 preferably extend at approximately a 45 degree angle from the main portion of lid 326. Hinge 327 is of the spring biased, snap action type, whereby lid 326 may initially be positioned as shown in FIG. 12 but wherein application of a predetermined amount of force tending to close lid 326 over shallow box 324 causes lid 326 to snap shut over shallow box 324, thereby causing darkness photosensor 170' to sense darkness. In this manner, reflector panel 80 is lowered in the same manner as is normally accomplished at the end of each day when darkness photosensor 170' senses sunset. After the dangerously high wind conditions have ceased, the user manually returns lid 326 to the position shown in FIG. 12 for allowing the skylight reflector assembly to function in the normal manner.

Only winds blowing in particular directions relative to reflector panel 80 pose any threat to the structural integrity of the reflector assembly or the light transmissive panel of the skylight. In particular, winds directed generally toward and into the surface of reflecor panel 80 which faces the skylight, and hence tending to lift reflector panel 80 upwardly, are considered more dangerous than winds directed toward the opposite, outer face of reflector panel 80. As demonstrated in FIG. 13, the wind sensing apparatus shown in FIG. 12 is actuated only by winds directed toward the inner, reflective surface of reflector panel 80, symbolically illustrated by arrows 332, 334, and 336. Winds directed toward the outer face of reflector panel 80 (symbolically illustrated by arrows 338, 340, and 342) have no tendency to close lid 326 and, hence, do not cause reflector panel 80 to be lowered.

Those skilled in the art will now appreciate that a trackiing reflector assembly has been described for use in conjunction with new or existing skylights, which reflector assembly may easily be installed and subsequently removed if desired. The desired apparatus serves to direct additional amounts of sunlight through the skylight, supplementing those rays of sunlight which directly strike the dome of the skylight. Horizontal and vertical drive mechanisms and associated control circuitry have been described for allowing the tracking skylight reflector assembly to track daily and seasonal movements of the sun. The described apparatus is relatively inexpensive and simple to construct and substantially immune to adverse weather conditions. Moreover, the described skylight reflector assembly may easily be adjusted to account for skylights having domes of varying heights. A control mechanism has also been described in conjunction with the tracking skylight reflector assembly for limiting upward pivotal movement of the reflector to prevent excessive summer heat gain during midday hours, preferably by limiting the angle between the reflector panel and the horizon to approximately 75 degrees. Control mechanisms have also been described for sensing darkness to reset the reflector assembly in readiness for sunrise on the following day, and for shutting down the reflector assembly either upon the occurrence of dangerously high wind conditions or under the manual control of the user.

While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A skylight reflector assembly for usage with a conventional skylight and adapted to track daily and seasonal movements of the sun, the skylight including a light transmissive panel having a center portion and supported within a frame, said skylight reflector assembly comprising in combination;
   a. a ring of a diameter commensurate with the width of the skylight frame;
   b. a plurality of rollers disposed above the skylight frame for rotatably supporting said ring above the light transmissive panel of the skylight, said plurality of rollers allowing said ring to rotate about an axis substantially perpendicular to the center portion of the light transmissive panel;
   c. said ring including a track for engaging said plurality of rollers to allow said ring to rotate relative to the skylight;
   d. a plurality of support brackets secured to the skylight frame for supporting said plurality of rollers, each of said support brackets having at least one of said rollers secured thereto;
   e. a reflector pivotally coupled to said ring for reflecting sunlight through the light transmissive panel of the skylight in addition to sunlight which strikes the light transmissive panel directly, said reflector being pivotally movable between a closed position overlying and shading the light transmissive panel of the skylight and an opened position allowing sunlight to pass through the light transmissive panel;
   f. vertical drive means coupled to said reflector for pivoting said reflector relative to said ring;
   g. horizontal drive means coupled to said ring for rotating said ring as well as said reflector pivotally coupled thereto; and
   h. control means responsive to the position of the sun for controlling said vertical drive means and said horizontal drive means to cause said reflector to track movements of the sun.

2. A skylight reflector assembly as recited by claim 1 wherein said track is formed as a channel within an annular wall of said ring.

3. A skylight reflector assembly as recited by claim 1 wherein each of said support brackets includes adjustment means for adjustably varying the height of said rollers above the skylight frame in order to support said ring at a sufficient height to prevent said reflector from contacting the center of the light transmissive panel when said reflector is pivoted to its closed position.

4. A skylight reflector assembly as recited by claim 1 wherein a face of said ring is provided with a toothed surface, and wherein said horizontal drive means includes a rotatable drive gear engaged with said toothed surface for rotating said ring.

5. A skylight reflector assembly adapted to track daily and seasonal movements of the sun, the skylight including a light transmissive panel having a center portion and supported within a frame, said skylight reflector assembly comprising in combination:
   a. a base member;
   b. support means for rotatably supporting said base member above the light transmissive panel of the skylight, said support means allowing said base member to rotate about an axis substantially perpendicular to the center portion of the light transmissive panel;
   c. a reflector pivotally coupled to said base member for reflecting sunlight through the light transmissive panel of the skylight in addition to sunlight which strikes the light transmissive panel directly, said reflector being pivotally movable between a closed position overlying and shading the light transmissive panel of the skylight and an opened position allowing sunlight to pass through the light transmissive panel;
   d. vertical drive means coupled to said reflector for pivoting said reflector relative to said base member;
   e. horizontal drive means coupled to said base member for rotating said base member as well as said reflector pivotally coupled thereto; and
   f. control means responsive to the position of the sun for controlling said vertical drive means and said horizontal drive means to cause said reflector to track movements of the sun, said control means including:
      i. first and second photosensors mounted to said reflector for pivotal movement therewith;

ii. shade means mounted to said reflector for pivotal movement therewith and disposed adjacent said first and second photosensors for shading said first and second photosensors from direct rays of sunlight when the sun is at a particular angular elevation in the sky relative to said reflector, said shade means allowing direct rays of sunlight to strike said first photosensor when the sun is at an angular elevation greater than said particular angular elevation while allowing rays of sunlight to strike said second photosensor when the sun is at an angular elevation less than said particular angular elevation; and iii. circuit means responsive to said first photosensor for causing said vertical drive means to pivot said reflector upwardly when said first photosensor receives direct sunlight and responsive to said second photosensor for causing said vertical drive means to pivot said reflector downwardly when said second photosensor receives direct sunlight, said circuit means assuming a quiescent state when both of said first and second photosensors are shaded from direct rays of sunlight.

6. A skylight reflector assembly as recited in claim 5 wherein said shade means includes first and second shade panels disposed in front of said front and second photosensors, respectively, relative to the sun, said shade means further including means for adjustably varying the positions of said first and second panels relative to said first and second photosensors for adjustably selecting the relative angular elevations of the sun at which direct rays of sunlight can strike said first and second photosensors, respectively.

7. A skylight reflector assembly as recited in claim 5 further including open position sensing means for sensing that said reflector has been pivoted to a fully opened position, said circuit means being responsive to said open position sensing means for inhibiting said vertical drive means from further pivoting said reflector upwardly despite the receipt of direct sunlight by said first photosensor.

8. A skylight reflector assembly as recited in claim 7 wherein said fully opened position is approximately 75 degrees to the horizontal for minimizing the amount of direct sunlight reflected by said reflector into the skylight when the sun is at relatively high angular elevations.

9. A skylight reflector assembly as recited in claim 7 wherein said open position sensing means includes means for adjustably selecting the pivot angle between said reflector and said base member corresponding to said fully opened position to accommodate skylights disposed at various angles to the horizontal and to adjustably select the angle of said reflector relative to the horizontal at the fully opened position.

10. A skylight reflector assembly as recited in claim 7 further including closed position sensing means for sensing that said reflector has been pivoted to said closed position, said circuit means being responsive to said closed position sensing means for inhibiting said vertical drive means from further pivoting said reflector downwardly.

11. A skylight reflector assembly as recited in claim 5 further including a third photosensor responsive to the amount of light received from the sun irregardless of the angular elevation thereof and generating a darkness signal when the amount of light received from the sun is below a predetermined amount needed for practical illumination of a space below the skylight, said circuit means being responsive to said darkness signal for causing said vertical drive means to pivot said reflector downwardly to said closed position.

12. A skylight reflector assembly as recited in claim 5 further including wind sensing means mounted to said reflector and responsive to the amount of wind directed into and under said reflector and generating a high wind signal when said amount of wind exceeds a predetermined amount, said circuit means being responsive to said high wind signal for causing said vertical drive means to pivot said reflector downwardly to said closed position.

13. A skylight reflector assembly as recited in claim 5 wherein said control means includes an electrical switch disposed within the space below the skylight and controlled by a user, said switch having first and second positions, said circuit means being responsive to the first position of said switch for enabling said first and second photosensors and being responsive to the second position of said switch for disabling said first and second photosensors and for causing said vertical drive means to pivot said reflector downwardly to said closed position.

14. A skylight reflector assembly adapted to track daily and seasonal movements of the sun, the skylight including a light transmissive panel having a center portion and supported within a frame, said skylight reflector assembly comprising in combination:

a. a base member;

b. support means for rotatably supporting said base member above the light transmissive panel of the skylight, said support means allowing said base member to rotate about an axis substantially perpendicular to the center portion of the light transmissive panel;

c. a reflector pivotally coupled to said base member for reflecting sunlight through the light transmissive panel of the skylight in addition to sunlight which strikes the light transmissive panel directly, said reflector being pivotally movable between a closed position overlying and shading the light transmissive panel of the skylight and an opened position allowing sunlight to pass through the light transmissive panel;

d. vertical drive means coupled to said reflector for pivoting said reflector relative to said base member;

e. horizontal drive means coupled to said base member for rotating said base member as well as said reflector pivotally coupled thereto; and f. control means responsive to the position of the sun for controlling said vertical drive means and said horizontal drive means to cause said reflector to track movements of the sun, said control means including:

i. a horizontal control photosensor coupled to said base member for rotational movement therewith;

ii. shade means disposed adjacent said horizontal control photosensor for shading said horizontal control photosensor when said reflector extends generally toward the sun, said shade means allowing direct rays of sunlight to strike said horizontal control photosensor when westerly movements of the sun result in said reflector extending generally eastwardly of the position of the sun; and iii. circuit means responsive to said horizontal control photosensor for causing said horizontal drive means to rotate said base member and said reflector pivotally connected thereto in a westerly direction until said horizontal control photosensor is again shaded from direct rays of sunlight.

15. A skylight reflector assembly as recited by claim 14 including an additional photosensor responsive to the amount of light received from the sun irregardless of the east-west position thereof and generating a darkness signal when the amount of light received from the sun is below a predetermined amount needed for practical illumination of a space below the skylight, said circuit means being responsive to said darkness signal for causing said horizontal drive means to rotate said base member and said reflector pivotally coupled thereto toward the east to return the same to a full-east position.

16. A skylight reflector assembly as recited in claim 14 including a full west position sensing means for sensing that said reflector has been rotated by said horizontal drive means in a predetermined rotational direction to a westerly position generally corresponding to the position of the sun at dusk, said circuit means being responsive to said full west position sensing means for preventing said horizontal drive means from further rotating said base member in said predetermined rotational direction.

17. A skylight reflector assembly as recited by claim 15 wherein said horizontal drive means is reversible for rotating said base member in either first or second opposing rotational directions, and wherein said horizontal drive means returns said base member to said full east position by rotating said base member in a rotational direction opposite to that in which said horizontal drive means rotates said base member in response to said horizontal control photosensor for preventing said base member from being rotated through a complete 360 degree angular revolution.

18. A skylight reflector assembly as recited in claim 14 wherein said control means includes indicating means for indicating the onset of dusk, said circuit means being responsive to said indicating means for causing said horizontal drive means to rotate said base member and said reflector pivotally coupled thereto toward the east to return the same to a full east position.

19. A skylight reflector assembly as recited by claim 18 further including a full east position sensing means for sensing that said reflector has been returned by said horizontal drive means to said full east position, said circuit means being responsive to said full east position sensing means for terminating the operation of said horizontal drive means initiated by said indicating means.

20. A skylight reflector assembly as recited by claim 14 wherein said control means includes an electrical switch disposed within the space below the skylight and controlled by a user, said switch having first and second positions, said circuit means being responsive to the first position of said switch for enabling said horizontal control photosensor and being responsive to the second position of said switch for disabling said horizontal control photosensor and for causing said horizontal drive means to rotate said base member and said reflector pivotally coupled thereto toward the east to return the same to a full east position.

* * * * *